(12) United States Patent
Fragnito (10) Patent No.: US 7,056,254 B1
(45) Date of Patent: Jun. 6, 2006

(54) NON-SLIP CONTINUOUSLY VARIABLE TRANSMISSION

(76) Inventor: Frank A. Fragnito, 4204 Boone La., Sacramento, CA (US) 95821-4206

( * ) Notice: Subject to any disclaimer, the term of this patent is extended or adjusted under 35 U.S.C. 154(b) by 0 days.

(21) Appl. No.: 11/185,596

(22) Filed: Jul. 20, 2005

(51) Int. Cl.
*F16H 37/02* (2006.01)
*F16H 21/12* (2006.01)

(52) U.S. Cl. .......................................... 475/207; 74/63
(58) Field of Classification Search ................ 74/63, 74/425.5; 475/207, 304
See application file for complete search history.

(56) References Cited

U.S. PATENT DOCUMENTS 3,442,156 A * 5/1969 Novinger .................... 475/302

* cited by examiner

*Primary Examiner*—Dirk Wright
(74) *Attorney, Agent, or Firm*—Alfred M. Walker (57) ABSTRACT

A non-slip continuously variable transmission (CVT) uses the positive engagement of gear teeth and does not rely on friction to transmit torque. The transmission has a ring gear with spur gear teeth at its periphery and conical teeth at its top surface adjacent to an offset circular track. The circular track or channel guide is a slightly smaller diameter than the ring gear and is positioned within the ring gear. Short plates with worm gears pivoted on cantilever brackets are constrained to move within the circular path defined by the channel guide. Due to the offset from the ring gear, a plate traversing this path will engage the conical teeth of the ring gear over a short arc of travel as the worm gear enters and then leaves engagement. This ability to move the ring gear over an arc by passing a worm gear plate around the near region of the circular channel can be reversed in both direction and in principal by having the ring gear move the worm gear plate.

11 Claims, 6 Drawing Sheets

NON-SLIP CONTINUOUSLY VARIABLE TRANSMISSION

FIELD OF THE INVENTION

The present invention relates generally to non-slip continuously variable transmissions and more specifically to worm gear assemblies for interacting in a continuously variable transmission.

BACKGROUND OF THE INEVNTION

A transmission is used to match the speed and torque of a rotating load with that of the motor or engine driving it. The driven end is designated as the input while the shaft or member attached to the load is designated as the output.

In vehicular applications, the input speed is always higher than the output speed of a transmission, while in some industrial applications where high speed is required for an operation, the opposite is sometimes true. In any case, a transmission has an input and an output and has control over the ratio of rotational speed between them.

Gears have traditionally been used to achieve these speed ratios. Multiple gear sets are used within a transmission if a variety of fixed ratios are required. A more desirable device would offer the user the ability to continuously vary the speed ratio between input and output over a wide range. Continuously variable transmissions (CVT's) have been designed to achieve this result.

A wide variety of geometric alternatives and driving members have been tried over the years. Disk/disk, ball drives and belt drives have been used in CVT's. Some designs use sliding friction while others use rolling friction between members to transmit torque from input to output. While gears use mechanical interlocking to prevent slippage, friction drive elements are subject to slippage and may have a limited capability to transfer torque. Therefore, the size of the elements themselves must be increased or the contact forces between them must be increased (or both) to provide adequate torque capability. The measures to prevent slippage work against the dual goals of achieving compactness and low component wear. This has been the principle impediment to the broad application of CVT's in heavy-duty applications.

Further, in the employment of gear systems for CVT applications, there lies the problem of continuously phasing the gear teeth of the gear in communication with the input shaft and the gear teeth in communication with the output shaft. The current invention provides a means for compensating for a continuously varying phase difference in manner which is smooth and minimizes wear.

SUMMARY OF THE INVENTION

In keeping with these objects and others, which may become apparent, the present invention is a non-slip continuously variable transmission (CVT) which has applications to a variety of automotive, industrial, lawn maintenance, construction equipment, and like devices. It uses the positive engagement of gear teeth and does not rely on friction to transmit torque. Power flows from an input gear to a ring gear to worm gear plates, which are dually constrained to move in a circular track and along the spokes of a spoke gear, the movement of which turns an output gear. Power can also flow in a reverse direction with input and output gears reversing their roles.

Although the circular track is within the ring gear, these two entities are not concentric; their fixed offset creates an arc of engagement over which a worm gear plate will engage pins on the top surface of the ring gear.

The continuously adjustable speed ratio is controlled by varying the offset of the spoke gear subassembly (including the spoke gear/output gear) relative to the center of the circular track. This adjustable offset is accomplished by means of positioning a movable housing carrying the spoke gear assembly relative to the fixed housing, which carries the ring gear, the circular track, and the input gear.

In this continuously variable transmission, power is transmitted in a non-slip fashion using the engagement of gear teeth as well as the engagement of worm gear segments with conical pins on a ring gear.

One aspect to the operation of this transmission is a configuration of a ring gear with spur gear teeth at its periphery and conical teeth at its top surface adjacent to an offset circular track. The circular track or channel guide has a slightly smaller diameter than the ring gear and is positioned within the ring gear. Short plates with worm gears pivoted on cantilever brackets are constrained to move within the circular path defined by the channel guide. Due to the offset from the ring gear, a worm assembly traversing this path will engage the conical teeth of the ring gear over a short arc of travel as the worm gear enters and then leaves engagement. This ability to move the ring gear over an arc by passing a worm gear plate around the near region of the circular channel can be reversed in both direction and in principal by having the ring gear move the worm gear plate. This mechanism can be utilized in various transmissions. For example, this mechanism can be used in a transmission known as the "Fragnito Movement Ratchet" (FMR) (TM).

The transmission starts from an input gear constantly in mesh with the ring gear. In various embodiments, the transmission can be driven by the ring gear. When the transmission is driven by the ring gear, the ring gear is an output gear.

The ring gear, the circular channel, and the input gear are in a fixed relation to each other by housing members. A movable housing that can slide linearly in relation to the fixed housing is now introduced. The movable housing can position a large spoked gear such that a hub (of the spoked gear) is within the circle of the circular track when viewed from above. The moveable housing moves the hub either closer or farther away from the side of the circular track closest to the ring gear.

Worm gear plates, as described above, are threaded onto each of the spokes of the spoke gear and yet constrained to the channel circle as the spoke gear is turned. The worm gears move linearly on each spoke as each plate is provided with a linear bearing in a ball and socket holder.

In this manner, as the spoke wheel is turned, a worm gear will engage the ring gear over an arc, but the next worm gear will engage the ring gear (carried by the next spoke) before the previous worm gear has lost engagement.

The geometry can be designed so that continuous motion can be imparted to the spoke gear by the ring gear (or vice-versa) if the spoke frequency over the range of adjustment of the spoke wheel does not cause the arc of engagement to be exceeded. In constant mesh with the spoked wheel and also carried by the movable housing is the output (or input) gear. The spoked wheel does not drive or is not driven through its axle. It is driven or drives by virtue of the worm gears applying a tangential force on its spokes. This, in turn, is transmitted to the output gear via peripheral gear teeth.

The speed ratio of the transmission is continuously variable by virtue of the movement of the hub of the spoke wheel housing relative to the fixed housing. For example, when the input gear is driving the ring gear at a constant angular velocity, then a worm gear engaged with it over the arc of engagement will be carried over the same arc at the same average speed. However, depending on the distance of the worm gears to the hub, the same angular velocity of the ring gear will impart vastly different angular velocities to the spoked wheel and hence to the output gear.

The worm gears are free to turn in their respective brackets, but they will not "back drive" when engaged with the ring gear since the pitch is selected to lock-up over normal torque loadings. Because of the geometry, some relative movement is required during the arc of engagement between the worm gears and the conical teeth, this movement is easily accommodated by slight rotation of the worm gear, which offers little resistance to these tangential forces.

While retaining the general geometric relationships along with the overall operational concept, an alternate embodiment replaces the set of worm gear engagement elements with a set of small spur gears. It is useful to describe this embodiment by analogy to a planetary gearbox.

The small spur gears replacing the function of the worm gears of the previous embodiment can be viewed as planet gears which are in constant mesh with a fixed sun gear which takes over the function of the former circular track.

For example, the sun gear neither rotates nor translates with respect to the fixed frame. The sun gear is within a larger ring gear which has a fixed center of rotation offset from the center of the sun gear.

Likewise, the ring gear has gear teeth both on the inside and on the outer edge; the inner gear teeth mesh with the planet gears as they pass within the region of engagement, while the outer gear teeth are in constant mesh with an input (or output) gear.

At least one spur gear is in mesh with the ring gear at all times and at all speed settings to guarantee the non-slip operation of the transmission. A movable housing with an output (or input) gear in constant mesh with a slotted hub gear is used to vary the speed ratio in a similar fashion to the operation of the laterally movable subassembly containing the spoke wheel in the previous embodiment.

It is noted that the radial slots of the slotted hub gear engage the axles of the small spur gears which are also constrained to be in constant mesh with the sun gear by arms which rotate around the sun gear's center. So torque is transmitted via the radial slots in the same manner that torque was transmitted via the spokes in the previous embodiment.

BRIEF DESCRIPTION OF THE DRAWINGS

The present invention can best be understood in connection with the accompanying drawings. It is noted that the invention is not limited to the precise embodiments shown in drawings, in which.

DETAILED DESCRIPTION

Worm gears and continuously variable transmissions (CVT's) which are capable of utilizing the worm gears are described herein. In the following description, numerous specific details are set forth to provide a more thorough understanding of the invention. As will be apparent to those skilled in the art, however, various changes using different configurations may be made without departing from the scope of the invention. In other instances, well-known features have not been described in order to avoid obscuring the invention. Thus, the invention is not considered limited to the particular illustrative embodiments shown in the specification and all such alternate embodiments are intended to be included in the scope of this invention. Many alternate details of housings and bearings are possible. The drawings and text that follow are only intended to provide a general illustration of one embodiment of the invention.

One aspect of relates to the use of intermittent engagement elements (also referred to herein as "worm gears"), which drive a spoked gear over a limited arc (during engagement of the worm gears with a ring gear). Successive worm-gears (where each worm gear is attached to a respective spoke) engage the ring gear, before a previous worm gear has left an arc of engagement. This operation provides continuous gear tooth engagement of the CVT.

Figures 1, 2:
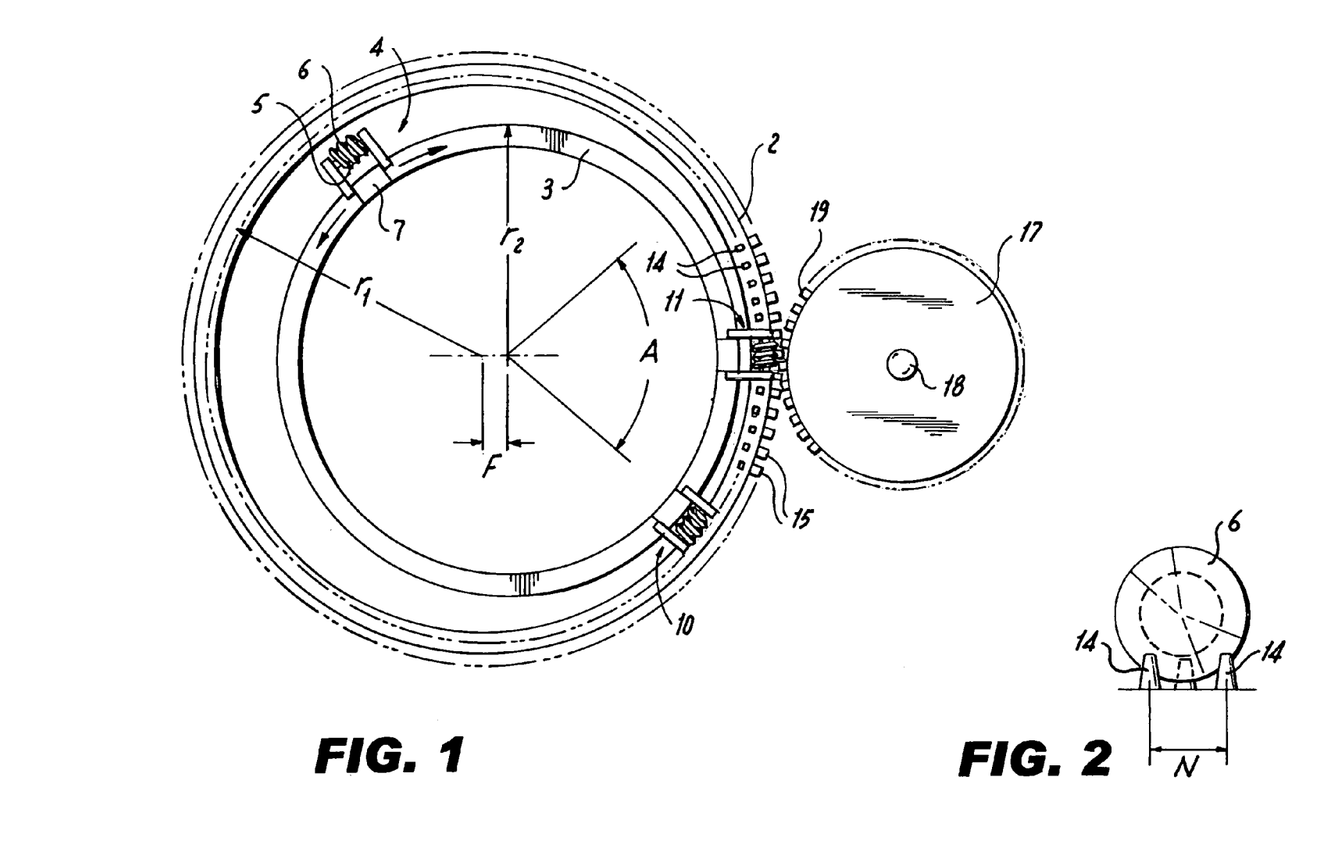
FIG. 1 is a Top plan view of a portion of a transmission used in accordance with the present invention.
FIG. 2 is an End view of a worm gear used in accordance with the invention.

FIG. 1 is a Top plan view of a portion of a transmission used in accordance with the present invention. Specifically, FIG. 1 depicts a top view of a movement ratchet 1. The ratchet 1 includes a ring gear 2, a circular channel guide (also referred to as a track) 3, and an input gear 17.

The ring gear 2 has a radius "r1" and the circular channel guide 3 has a radius "r2." Radius r2 is larger than radius r1. The difference between the center of the circular channel guide 3 and the ring gear 2 is represented by an offset "F.". Ring gear 2 engages input gear 17 at its periphery via gear teeth 15 on the periphery of ring gear 2 meshing with gear teeth 19 located on the periphery of input gear 17. In addition, ring gear 2 has a plurality of conical pins 14 positioned on another periphery of the ring gear 2 and substantially perpendicular to the gear teeth 15.

Each spoke is centrally connected to each other at one end and at the other end of each spoke is a worm assembly. Illustratively, FIG. 1 is depicted as having worm assemblies 4, 10, and 11 constrained to move within circular channel guide 3. It is appreciated that the invention can utilize more or less worm assemblies. However, for simplicity the spokes are not shown in FIG. 1 but are shown in subsequent figures and described with respect thereto.

Each worm assembly 4, 10, and 11 includes a pair of brackets 5 which secures a worm gear 6 to a plate 7. "A" denotes an arc of engagement of worm gear assemblies 4, 10, and 11 which fits track 3. Note that as the ring gear 2 rotates about the circular channel guide 3, the off set F causes a portion of the circular channel guide 3 to be closer to a portion of the ring gear 2. As such, all of the worm assemblies 4, 10, and 11 are able to interact with the conical pins 14. The area in which the worm assemblies 4, 10, and 11 interact is referred to as the arc of engagement A.

However, because of the off set F, a worm assembly outside of the arc of engagement will not interact with the conical pins 14. For example, in FIG. 1, worm assembly 11 is at the center of the arc of engagement; worm assembly 10 is at outer limits (yet still within) of the arc of engagement; and Plate 4 outside the arc of engagement and not in contact with conical pins 14.

FIG. 2 is a schematic end view showing the relation of a single conical pin 14, over times $t_1$, $t_2$, and $t_3$, with worm gear 6 that is within the arc of engagement. The point of engagement moves a distance "N" across the face of a groove of worm gear 6. This can easily turn worm gear 6 the required amount so that there is little or no binding or slippage. At entrance and exit to the arc of engagement A shown in FIG. 1, pin 14 is at a leftmost position (i.e., at $t_1$). Further rotation of worm gear 6 advances conical pin 14 positions conical pin 14 towards a central periphery of worm gear 6 (i.e., at $t_2$). Still further rotation of worm gear 6 positions the conical pin 14 at the extreme right of the worm gear 6 (i.e., at $t_3$). Also note that during rotation of the worm gear 6 and also due to the off set F, that the circular channel guide 3 is being repositioned with respect to the ring gear 2. For example, FIG. 1 depicts worm assembly 11 is within the arc of engagement. However, as time progresses, worm assembly 4 will be in the arc of engagement.

Figure 3:
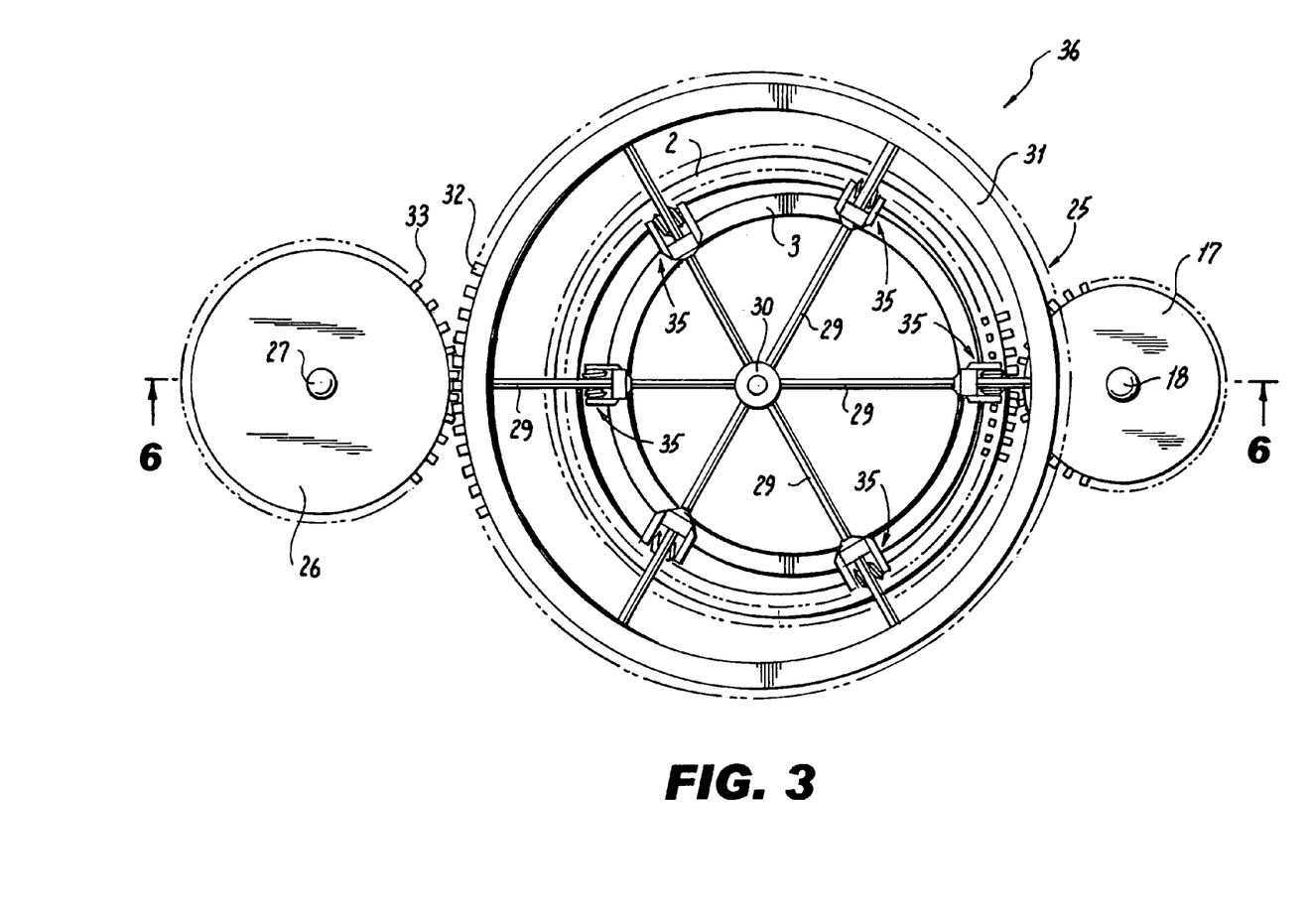
FIG. 3 is another Top plan view of a transmission used in accordance with the invention.

FIG. 3 is another Top plan view, without showing housing details, of a transmission used in accordance with the invention. To summarize, spoke gear 25 has spokes 29 connecting hub 30 and rim 31. Each spoke 29 has a worm gear assembly 35 movably attached via a linear bearing 38 within a ball and socket 37. Each worm gear assembly 35 is dually constrained to ride within circular track 3 and along a spoke 29. Ball and socket 37 permits the worm gear axis of assembly 35 to align itself so as to be always in a direction tangent to circular track 3 regardless of the instant direction of spoke 29 relative to track 3. In addition, transmission 36 shows the addition of spoked gear 25 with meshed output gear 26 to move ratchet 1. Gear teeth 32 are constantly meshed with teeth 33 by virtue of a movable housing (not shown) which can move the subassembly of spoked gear 25 and gear 26 left or right to adjust speed and torque capability. Each of the spokes 29 (illustratively 6) has a worm assembly 35, which can slide radially but is confined to following track 3. Gear 25 is shown with six spokes 29, but fewer or more spokes can be used as required to ensure continuous engagement of one or more worm plates 35 with ring gear 2 over the range of adjustment.

Figure 4:
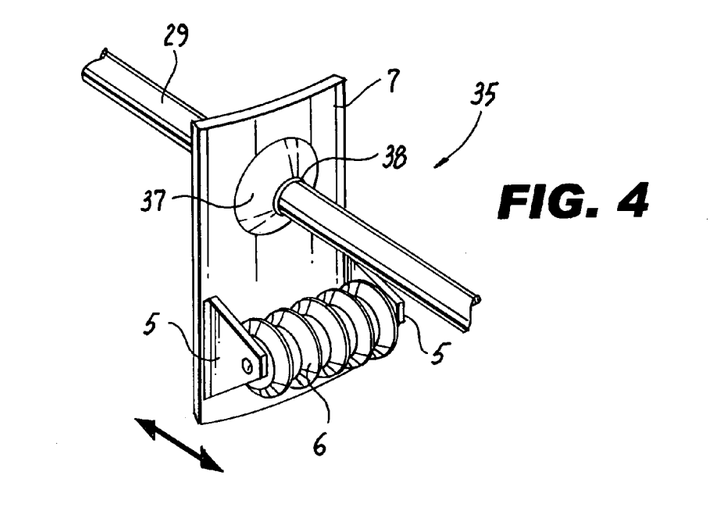
FIG. 4 is a Perspective view of a worm assembly in accordance with the invention.

FIG. 4 is a Perspective view of a worm assembly 35 in accordance with the invention. Worm assembly includes plate 7 curved to fit circular channels 3 [[both top and bottom-A1, what does this mean?]]; Brackets 5 secure worm gear 6 to plate 7 yet allow worm gear 6 to freely pivot. Spoke 29 slides in and out of linear bearing 38 attached to ball 37 of a ball and socket retainer located within plate 7.

Figure 5:
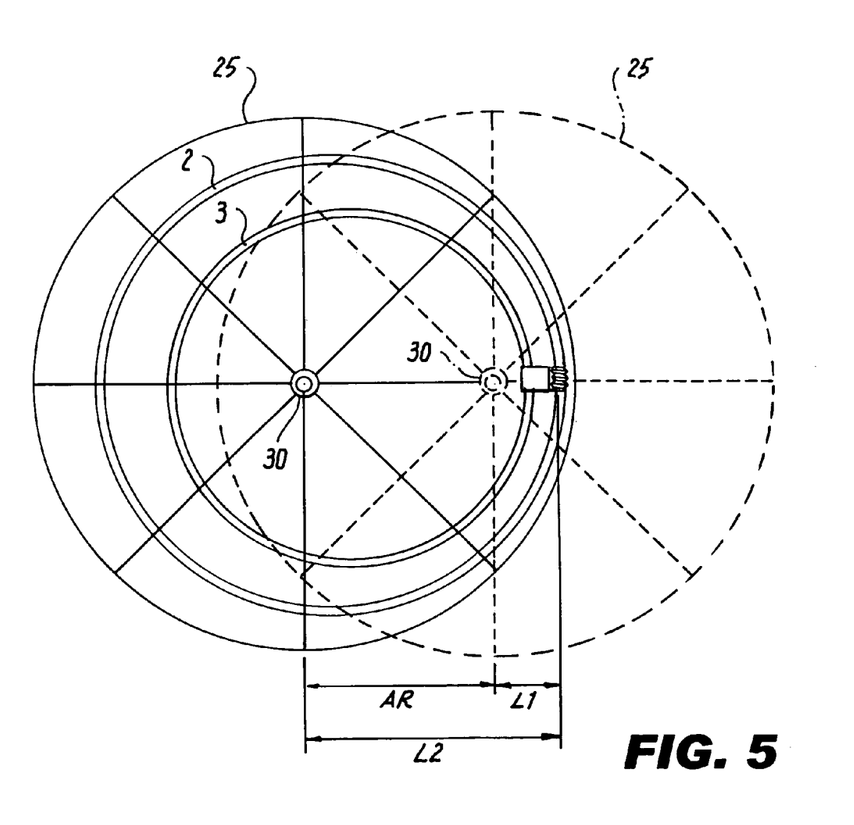
FIG. 5 is a Top plan schematic representation of a spoked gear over range of adjustment.

FIG. 5 is a Top plan schematic representation of a spoked gear 25 over range of adjustment (AR) of spoked gear 25 shown as solid in its rightmost position and as dashed in its leftmost position. If ring gear 2 is driving, the dashed position of gear 25 is the highest speed setting since short lever arm L1 is used to turn gear 25; the solid position at left is the lowest speed setting since long lever arm L2 is used to turn gear 25. The achievable speed ratio is L2/L1 from highest to lowest output speed with a constant input speed. The maximum torque capability at L2 is L2/L1 as compared to the torque capability at L1.

Figure 6:
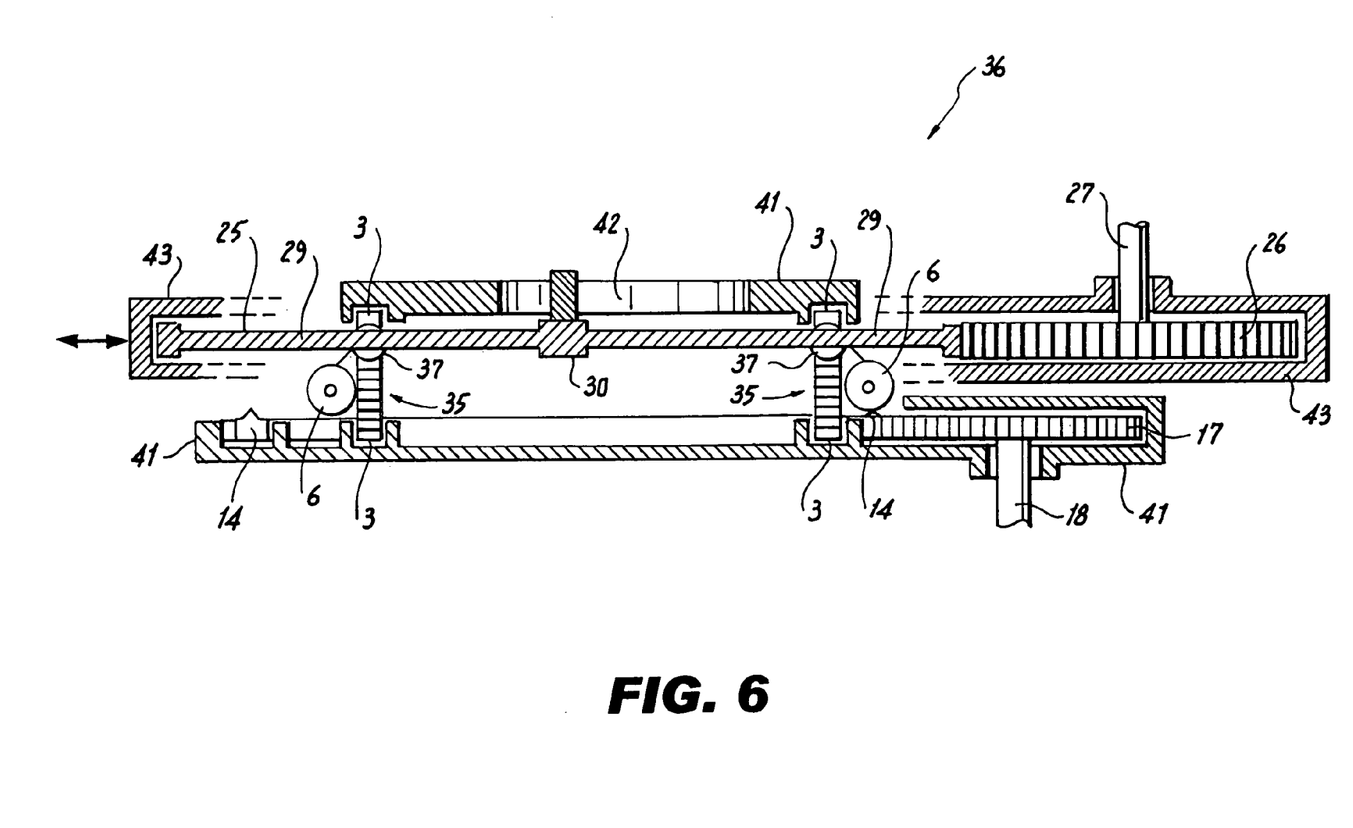
FIG. 6 is a Side cross-sectional view along the 6—6 line of the transmission depicted in FIG. 3.

FIG. 6 is a Side cross-sectional view along the 6—6 line of the transmission depicted in FIG. 3. In addition to the elements already described FIG. 6 also depicts the circular channel guide 3 having stationary housing sections 41, a slot 42 located in one of the stationary housing sections 41, an input axle 18 connected to the input gear 17, a housing section 43 for the output gear 26, and an output axle 27 coupled to the output gear 26.

Channels 3 (at the top and bottom) constrain worm assembly 35 to a circular path and substantially vertical with respect to the constrained path. Worm assembly $35_2$ (illustratively depicted on the right side of FIG. 6) is engaged with conical pin 14 and within the arc of engagement, while worm assembly $35_1$ (illustratively depicted on the left side of FIG. 6) is disengaged with any pin 14 and outside the arc of engagement (which is part of ring gear 2).

Housing sections 43 are also part of the movable subassembly that determines speed settings of the CVT of this invention. Slot 42 in top housing section 41 permits gear 25 to move left and right. Power flows from input axle 18 through gear 17 to ring gear 2 to worm gear 6 through spoke 29 to turn gear 25 and finally output gear 26 to output axle 27.

Figure 7:
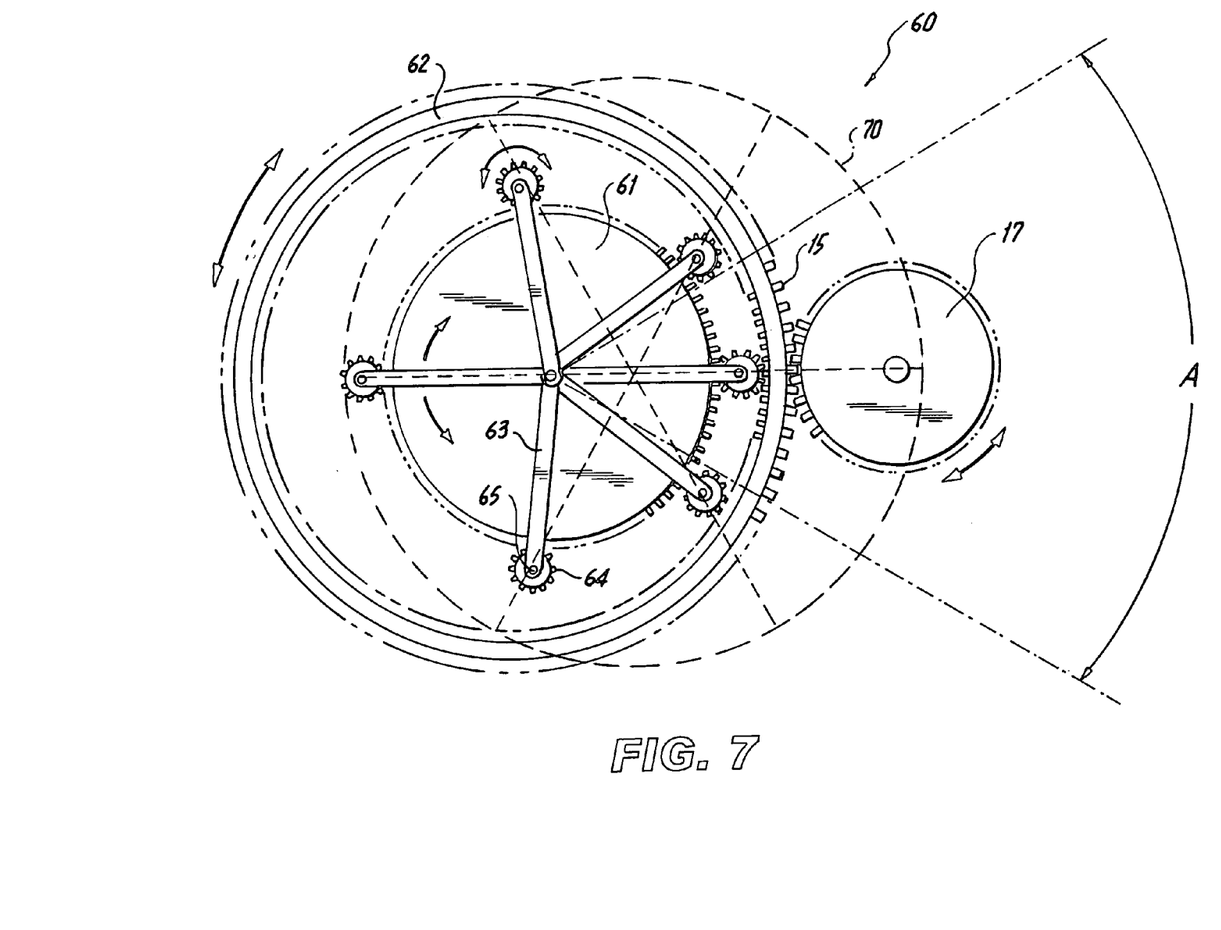
FIG. 7 is a top plan schematic view of the parts of an alternate embodiment of this transmission attached to the fixed housing portion.
Figure 8:
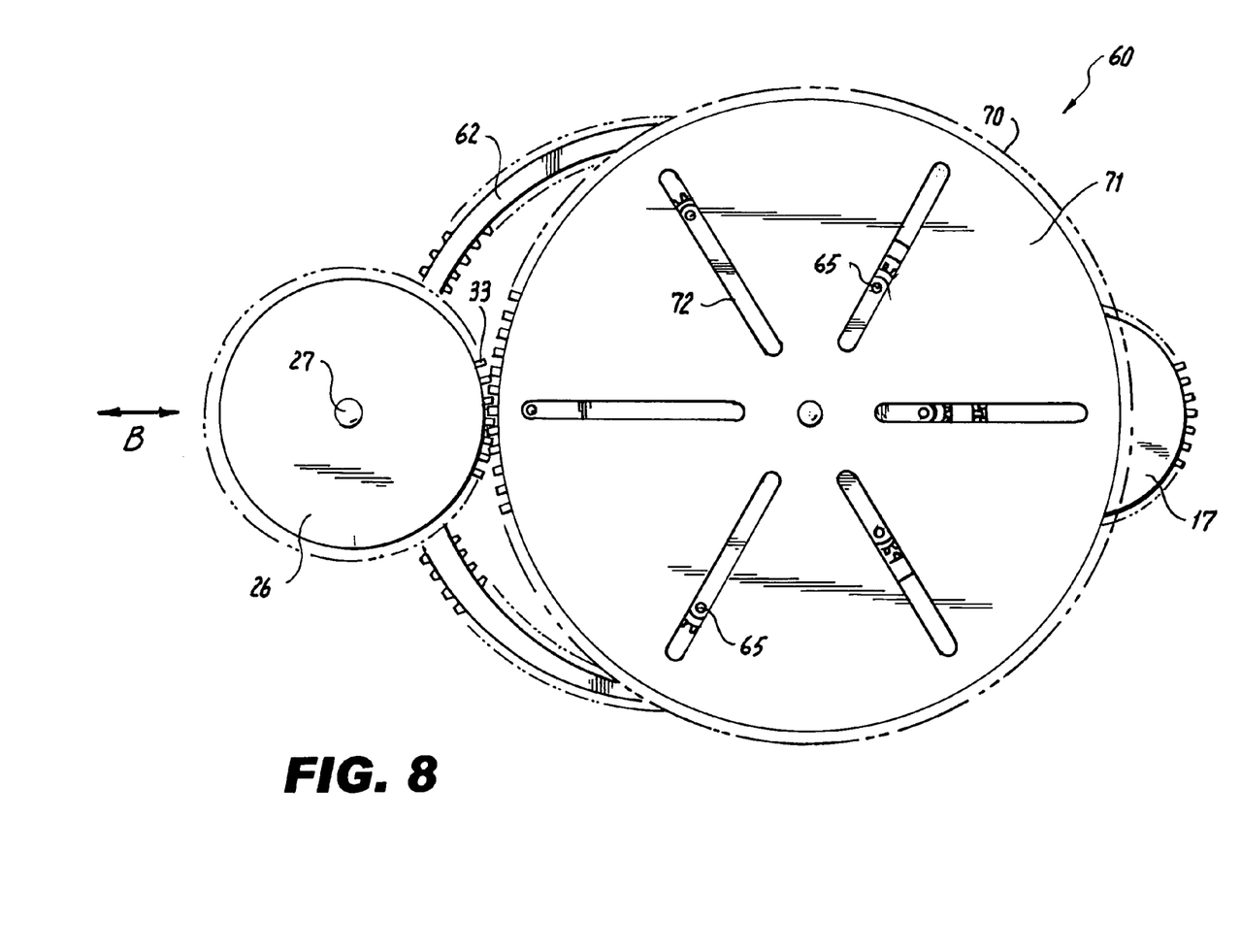
FIG. 8 is a top plan schematic view of the alternate embodiment transmission.

FIGS. 7 and 8 show schematically the major operating parts of an alternate embodiment 60 of this transmission using small spur gears instead of the worm gears of the previous embodiment for transmitting torque to or from the ring gear.

FIG. 7 shows the parts carried by the fixed frame of the transmission. Planetary gear nomenclature will be used by analogy to describe some of the parts. A fixed sun gear 61 which can neither rotate nor translate has gear teeth on its outer edge which are in constant mesh with those of planet gears 64 which are held in orbit via arms 63. Offset ring gear 62 rotates with a fixed center of rotation and is in constant mesh with input gear 17. As in the previous embodiment, the input and output elements can be reversed in role so that gear 17 could become the output gear, however in this description it will be the input. Because of the offset, a region of engagement, A, is created such that a planet gear 64 within this region will engage the inner teeth of ring gear which will tend to rotate it on its own axle 65. Since gear 64 is also meshed with sun gear 61, it will move attached arm 63.

Shown in dashed lines only, slotted hub gear 70 is moved by the motion of planet gear 64 around sun gear 61 because axle 65 is also engaged in slot 72 of gear 70; this is more easily seen in FIG. 8.

As slotted hub gear 70 is rotated, it drives output (or input) gear 26 with which it is constantly meshed. Gears 26 and 70 are carried by a subframe (not shown) that can move laterally in directions B relative to the fixed frame of the transmission. By moving the subframe to the right, the torque arm of axle 65 of a planet gear 64 within the region of engagement is made shorter with respect to the center of slotted gear 70. Thus for a constant input speed of gear 17, gear 70 is driven faster thereby driving output gear 26 faster as well. By moving the subframe to the left, the opposite is true and the output speed would be reduced for a constant input speed.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended claims.

I claim:

1. A continuously variable transmission comprising:
    a ring gear wherein said ring gear has a radius r1, a plurality of peripheral pins emanating up from a top surface thereof, and a plurality of peripheral gear teeth;
    a circular channel guide positioned within said ring gear wherein said circular channel guide has a radius r2 smaller than radius r1;
    a spoke gear with a plurality of spokes; and
    a plurality of worm assemblies wherein each worm assembly is impaled by one of said spokes, said worm assemblies are secured to said circular channel guide, and have threads which correspond with said plurality of peripheral pins, wherein some worm assemblies in said plurality of worm assemblies engage said pins, causing an output gear to impart movement therefrom.

2. The transmission of claim 1 wherein each worm assembly in said plurality of worm assemblies comprises:
    a curved plate wherein said curved plate has a hole there-through;
    a linear bearing and ball and socket assembly in said hole wherein said linear bearing and ball and socket assembly receives one of said spokes and allows said worm assembly to move linearly thereon;
    a pair of brackets connected to said curved plate; and
    a worm gear coupling said pair of brackets and freely rotatable there-between.

3. The transmission of claim 2 wherein said pair of brackets are cantilevered.

4. The transmission of claim 1 wherein said impalement comprises threading each said worm assembly onto one of said spokes.

5. The transmission of claim 1 wherein said plurality of pins are conical.

6. The transmission of claim 1 further comprising:
    an input gear wherein said input gear, said ring gear, and said circular channel guide are within a housing member.

7. The transmission of claim 1 wherein a difference between r1 and r2 causes an offset, wherein said offset is adjustable to vary a speed ratio.

8. A worm assembly comprising:
    a curved plate wherein said curved plate has a hole there-through;
    a linear bearing and ball assembly in said hole wherein said linear bearing and ball assembly receives a spoke end and allows said spoke end to move linearly therein;
    a pair of brackets connected to said curved plate; and
    a worm gear coupling said pair of brackets and freely rotatable there-between.

9. The transmission of claim 7 wherein said pair of brackets are cantilevered.

10. A continuously variable transmission comprising:
    a fixed non-rotatable sun gear having gear teeth on its respective outer edge; said teeth being in constant mesh with corresponding teeth of a plurality of planet gears; said planet gears being held in orbit via radially extending arms extending from said fixed sun gear;
    a rotatable offset ring gear rotating with a fixed center of rotation being in constant mesh with an input gear;
    said input gear being alternatively functional as an output gear;
    wherein a region of engagement is created such that a respective planet gear within said region of engagement engages respective inner teeth of said ring gear, thereby rotating said planet gear on its own respective axle;
    each said planet gear moving its respective radially extending arm;
    wherein further, a slotted hub gear is moved by the motion of said planet gear around said sun gear as each respective axle of each said planet gear is also engaged in a respective slot of said hub gear;
    wherein, as said slotted hub gear is rotated, it drives an output gear.

11. The transmission as in claim 10 wherein said hub gear and said output gear are carried by a subframe moving laterally relative to the fixed frame of the transmission;
    whereby, by moving said subframe in one direction, a torque arm of a respective axle of a respective planet gear within the region of engagement is made shorter with respect to the center of said slotted gear,
    wherein further for a constant input speed of said input gear, by moving said subframe in a first direction, said input gear is driven faster, thereby driving said output gear faster;
    and wherein by moving said subframe in an opposite direction, said output speed is reduced for a constant input speed.

* * * * *